Oct. 12, 1965    A. ZIMMERMANN    3,211,409
HIDDEN MOUNT
Filed Dec. 11, 1964
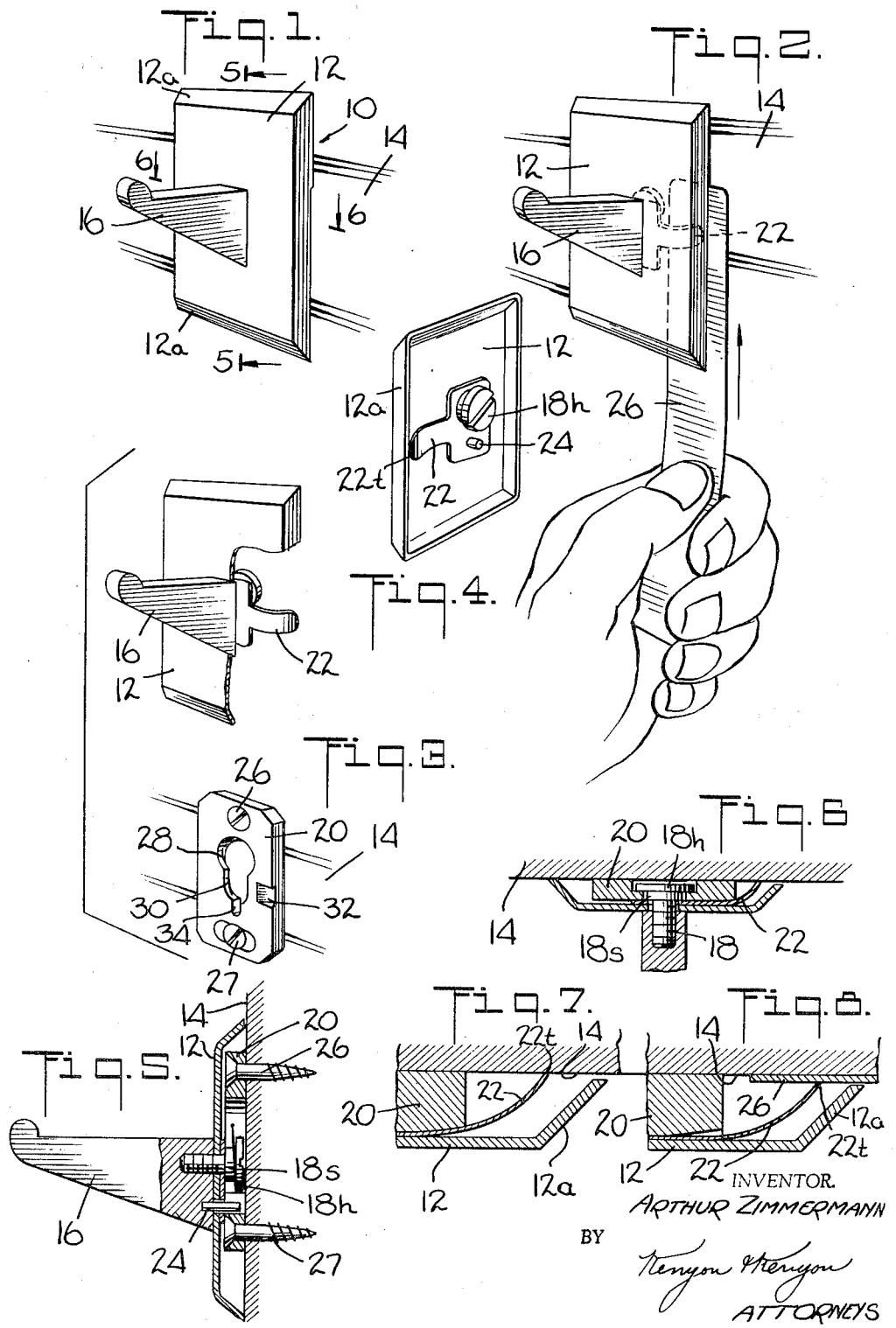
INVENTOR.
ARTHUR ZIMMERMANN
BY
Kenyon & Kenyon
ATTORNEYS

United States Patent Office 3,211,409
Patented Oct. 12, 1965

3,211,409
HIDDEN MOUNT
Arthur Zimmermann, Ridgewood, N.Y., assignor to G. M. Ketcham Manufacturing Corporation, Glendale, N.Y., a corporation of New York
Filed Dec. 11, 1964, Ser. No. 417,631
8 Claims. (Cl. 248—203)

This invention relates in general to a mount for a wall bracket and more particularly to a mounting mechanism which is hidden from sight and is of such nature as to lock the mount in place and foil anyone who would attempt to steal the bracket while permitting a maintenance man who knew the "secret" of this hidden mount to dismount the bracket when desired.

In hotels and other institutions open to the public, there is a recurrent problem of theft of bathroom fixtures and of other brackets which are mounted to the wall. Screws having special heads are frequently employed in lieu of a slotted head screw so as to inhibit theft. But, the removal of these screws generally requires only little more effort than the removal of a slotted head screw even if an appropriate screwdriver is not available. Generally speaking, this and other previously known techniques for mounting brackets to a wall so as to foil would-be thieves are unsatisfactory.

Accordingly, it is a major purpose of this invention to provide a theft-proof mount for a wall bracket.

It is, of course, possible to mount a bracket onto a wall in such a fashion that it cannot be taken down without destroying a portion of the wall or requiring the use of very complex tools. However, it is important that these brackets be relatively easy for authorized personnel to dismount for purposes such as repair of the bracket, replacement with a new style bracket or when the wall is to be painted and it is desired to make sure that the bracket itself is not spotted with paint.

Thus, it is an equally important purpose of this invention to provide a theft-proof mount for a wall bracket which permits the bracket to be dismounted when desired by authorized personnel.

It is a further purpose of this invention to provide the above purposes in a form and fashion that will be relatively inexpensive and that will not require complex tools.

In brief, the specific purpose of this invention is to provide a dismountable theft-proof wall bracket which may be easily dismounted by authorized personnel who know the secret of the mounting mechanism.

In brief, the bracket of this invention, when mounted on the wall, has the appearance of an ordinary bracket and, indeed, can be of almost any shape or form desired. Normally, the bracket will be characterized by the fact that it has a smooth, unbroken appearance because no screws, nuts, bolts or other fastening devices will appear on the visible surfaces of the bracket. The back surface of the bracket plate is recessed relative to the edges so that when the bracket is placed against the wall, a chamber is formed between the wall and the bracket plate. Within this chamber (and thus hidden from view) are the bracket mount and locking means.

From the back surface of the bracket plate there extends a shallow pin having a relatively small diameter on the end of which there is attached a disc having a relatively larger diameter. This disc, together with a leaf spring which is bent rearwardly (toward the wall on which the bracket is to be mounted), constitutes the locking mechanism on the back surface of the bracket plate. In addition, there is an anchor plate which is screwed to the wall and which is covered by the bracket plate so that the screws are not seen when this bracket is assembled. The anchor plate includes an opening adapted to receive the back surface of the bracket plate. This opening in the anchor plate is necked down and undercut from the back side so that the disc can be made to slip down within the anchor plate into the necked down area at which point the disc holds the entire bracket plate to the anchor plate against being pulled away from the wall.

Without more, the removal of the bracket plate would be a fairly simple thing in that the bracket plate could be moved along the surface of the wall until the disc was in position to be pulled right out of the anchor plate. However, according to this invention, there is also a shallow indentation cut into the anchor plate to receive and hold the leaf spring. When the locking disc of the bracket plate has been placed into the receiving hole in the anchor plate and pulled down to be engaged by the anchor plate, the leaf spring also travels down to become caught by the indent in the front surface of the anchor plate. Because the leaf spring snaps into the indent, it becomes impossible to pull the bracket plate up again so as to remove it once it has been locked into place. There is thus provided a lock for the bracket plate which cannot be unlocked by any manipulation of the bracket plate.

However, the leaf spring which is bent rearwardly toward the wall is designed so that the end of the leaf spring impinges against the wall. If a thin metal strip is now inserted under the appropriate edge of the bracket plate and brought under the leaf spring it will push the leaf spring forward enough so as to free the leaf spring from the shallow indent which otherwise functions to lock the leaf spring. Thus with a very simple tool, authorized personnel who know the secret of this bracket lock can unlock the bracket plate and then remove it from the anchor.

Other objects and purposes of this invention will become apparent from the following detailed description and drawings, in which:

FIG. 1 is a perspective view of a bracket embodiment of this invention as it would appear when mounted on a wall;

FIG. 2 is a perspective view similar to FIG. 1 except that the hidden leaf spring is also shown together with the tool and manner of removal for the bracket;

FIG. 3 is an exploded perspective of the bracket showing the bracket plate removed from the anchor plate;

FIG. 4 is a perspective view of the rear of the bracket plate;

FIG. 5 is a cross-sectional view along the plane 5—5 of FIG. 1;

FIG. 6 is a cross-sectional view along the plane 6—6 of FIG. 1;

FIG. 7 is a larger sized view of a portion of FIG. 6 showing the leaf spring in the state where it is locked to the anchor; and FIG. 8 is a view similar to FIG. 7 except that it shows the condition of the leaf spring when the tool that is employed to unlock the leaf spring is inserted.

All of the drawings relate to the same embodiment and the following detailed description refers to elements which are shown in many of the drawings.

The bracket 10 of this invention includes a bracket plate 12 which is set against a wall 14 and from which there may extend any one of a number of holding devices, such as the hook 16. The bracket plate 12 has bevelled edges 12a on all four sides so that the plate surface stands away from the wall 14 and so that the rear of the bracket plate 12 is a recessed area, as may be seen in FIG. 4.

As may best be seen in FIGS. 4 and 6, a screw 18 having a shoulder 18a and a disc-like flat head 18h, is shown as holding the hook 16 to the bracket plate 12. The fastening feature of this screw 18 is not important to this invention since the bracket plate 12 and hook 16 could be integral. What is important is that there be a device such as the disc 18h which stands away from the back surface of the bracket plate 12. For purposes of this discussion of the embodiment shown, attention must be kept on the fact that the shoulder 18s is of smaller diameter than the head 18h and is between the head 18h and the back surface of the bracket plate 12. This arrangement of shoulder 18s and disc 18h permits the disc 18h to be positively held by an anchor plate 20, in the fashion to be described below, so that the entire bracket plate 12 and hook 16 in turn can be held to the wall by the anchor plate 20.

The other significant elements on the back surface of the bracket plate 12 are a leaf spring 22 and a guide pin 24. Of the two, the leaf spring 22 is the important element in this invention. The leaf spring 22 is held onto the back surface of the bracket plate 12 by the shoulder 18s of the screw 18 and is kept in position by the guide pin 24. The guide pin 24 is attached to the bracket plate 12 and passes through a small hole in the leaf spring 22 as is shown in FIG. 5 but may be more readily comprehended by viewing FIG. 4. The leaf spring 22 is curved away from the back surface of the bracket plate 12 (back toward the wall 14) so that when the bracket plate 12 is mounted on the wall, the tip 22t of the leaf spring 22 is in contact with, and preferably presses against, the wall surface 14. As is explained below, this leaf spring 22 becomes locked in place when the bracket 10 is completely mounted so that the bracket plate 12 cannot be taken off the wall.

As may be seen in FIG. 2, a simple tool 26, which may be nothing more than a strip of spring steel, can be inserted between the bracket plate 12 and the wall surface 14 at the point where the spring tip 22t presses against the wall surface 14 to move the spring 22 slightly away from the wall. When the spring 22 is moved slightly away from the wall, the spring becomes unlocked from the anchor 20, as is explained below, and the bracket plate 12 can be moved up and released from the anchor 20.

FIG. 3 shows the anchor plate 20 in perspective view. The anchor plate 20 is held fast to the wall surface 14 by screws 26, 27 in a conventional fashion. The opening in the plate 20 for the bottom screw 27 is slotted to permit the anchor plate 20 to be vertically aligned on the wall 14, so that ultimately the bracket plate 12 can be properly squared or positioned on the wall surface 14. The anchor plate 20 has an opening 28 large enough in diameter to permit the disc 18h to pass through the opening 28. The opening 28 communicates with a smaller opening 30 that is large enough to permit the shoulder 18s to pass along the opening 30. The opening 30 is a complex opening in that half-way through the thickness of the anchor plate 20, the opening 30 expands to a dimension adequate to accommodate the plate 18h. Thus the mounting of the bracket plate 12 on the anchor plate 20 entails passing the disc 18h through the larger opening 28 and then bringing the entire bracket plate 12 down, along the surface of the wall, so that the disc 18h becomes held behind the opening portion 30.

Once in position, the bracket plate 12 will be held in position by the anchor plate 20 as is shown in FIGS. 5 and 6. The bracket plate 12 will be held against the wall by virtue of the disc 18h being held behind the opening 30. Since the thickness of the wall of the opening 30 is made to taper slightly and thus be slightly greater at the bottom of the opening 30 than at the top of the opening 30, the disc 18h will be squeezed back toward the wall as the bracket plate 12 is brought down during assembly of the bracket plate 12 and the anchor plate 20. The shoulder 18s passes within the opening 30 but the disc 18h passes behind the opening 30 and will be held tightly in toward the wall by virtue of the gradual increase in thickness of the opening 30 at the bottom portion of the opening 30.

When the shoulder 18s is seated against the bottom of the opening 30, the leaf spring 22 will have snapped into the indent 32 (see FIG. 3). With the leaf spring 22 snapped into the indent 32, it is no longer possible to move the bracket plate 12 up again. The indent 32 will positively hold the bracket plate in place against upward movement. The relationship between the head 18h, shoulder 18s and opening 30 are such as to prevent the bracket plate from moving in any other direction or being pulled away from the wall.

There is a small groove 34 which extends down from the opening 30 and into which the pin 24 fits. The pin 24 within the groove 34 assures that the bracket plate 12 cannot be rotated in place. The pin 24, slot 34 arrangement assists in guiding the bracket plate into position.

The leaf spring 22 is normally bent back with a curvature such that when the bracket plate 12 is first placed onto the anchor plate 20, the leaf spring must be pressed against the front surface of the anchor plate 20 in order to insert the disc 18h sufficiently far into the opening 28 so that the disc 18h can be brought down behind the opening 30. Thus the tapered walls of the opening 30 are effective to tightly hold the bracket plate 12 onto the anchor plate 20 because the leaf spring 22 is pushed forward from its relaxed position by the face of the anchor plate 20. More importantly, the design of the leaf spring 22 so that it must be pushed forward by the face of the anchor plate 20 assures that the leaf spring 22 will snap into the indent 32 when the bracket plate 12 is moved down into its locking position.

With the above in mind, it now becomes evident that the only way to remove the bracket plate 12 from the anchor plate 20 is to lift the leaf spring 22 forward so that it is free of the indent 32 and then move the bracket plate 20 up sufficiently so that the disc 18h can be pulled out through the opening 28. By making the indent 32 sufficiently shallow (it need be no deeper than the thickness of the leaf spring) it becomes possible to lift the leaf spring 22 out of the indent 32 by simply slipping a flat plate 26 behind the bracket plate 12 at the appropriate point, as illustrated in FIG. 2.

More specifically, and with reference to FIGS. 7 and 8, the leaf spring 22 is designed so that its tip 22t impinges against the wall surface 14 when the leaf spring 22 has snapped into the indent 32. This locked condition is shown in FIG. 7. When as shown in FIG. 8, the tool 26 is run along the wall under the bevelled edge 12a, the tool 26 lifts up the leaf spring 22 sufficiently to free the leaf spring 22 from the indent 32. Thus the repairman can remove the bracket plate 12 (while keeping the tool 26 in place) for whatever purpose is desired. In order for the tool 26 to get under the tip 22t of the leaf spring 22, it is important that the tip 22t be rounded, rather than squared off.

In the embodiment shown, the portion of the bevelled edge 12a which is near the leaf spring 22 (and under which the tool 26 must be inserted) is shown as being cut away from the wall by a very small amount sufficient to accommodate the thickness of the tool 26. This cut-away portion in the appropriate bevelled edge 12a need not necessarily be incorporated but may, as a matter of choice, be desired in order to minimize the scraping of the tool 26 along the wall surface 14.

This invention has been described in connection with a specific complete embodiment. Certain of the features illustrated or described are not essential to the practice of this invention and other features could be readily modified by one skilled in this art.

For example, it would be possible to arrange shoulders on the rear surface of the bracket plate 12 in such a fashion that the leaf spring 22 may be mounted on the anchor plate 20 and is bent toward a shoulder surface established on the bracket plate 12. Another shoulder could then be established on the bracket plate 12 having an indent such that the leaf spring 22 will snap into the indent when in place. An opening or a slot could then be provided so that the tool 26 could be inserted to pick up the leaf spring 22.

Similarly, the head 18*h* and shoulder 18*s* could be mounted on the anchor plate while the openings 28, 30 could be established in a plate that in turn is mounted onto the rear surface of the bracket plate 12. This reversal of functions would lead to a more complicated design and only a preferred embodiment is disclosed herein. However, it shall be understood that the following claims are intended to include structures in which the functions of the anchor plate and bracket plate are reversed.

In general, it shall be understood that the following claims are directed to the full scope of this invention.

What is claimed is:

1. A hidden mount mechanism comprising:
   an anchor plate adapted to be attached to a wall,
   a bracket plate adapted to be mounted on said anchor plate, and
   spring means mounted on the rear surface of said bracket plate,
   said anchor plate having an indent adapted to receive said spring means,
   said spring means being positioned on said anchor plate such that said spring means will snap into said indent when said bracket plate has been mounted on said anchor plate.

2. A bracket capable of being removably locked to a wall comprising:
   an anchor plate adapted to be attached to a wall and having a forwardly facing surface,
   a bracket plate adapted to be mounted on said anchor plate and having a rearwardly facing surface,
   a leaf spring attached to a first one of said surfaces, said leaf spring being bent in the direction of the second one of said surfaces,
   said second one of said surfaces having an indent along an edge thereof adapted to receive said leaf spring, and
   means for mounting said bracket plate on said anchor plate in a position where said leaf spring will snap into said indent, 3. A bracket capable of being removably locked to a wall comprising:
   an anchor plate adapted to be attached to a wall and having a forwardly facing surface,
   a bracket plate adapted to be mounted on said anchor plate and having a rearwardly facing surface,
   a leaf spring attached to a first one of said surfaces, said leaf spring being bent in the direction of the second one of said surfaces,
   said second one of said two surfaces having an indent along an edge thereof adapted to receive said leaf spring, and
   means for mounting said bracket plate on said anchor plate in a position where said leaf spring will snap into said indent,
   said leaf spring being bent sufficiently toward said second one of said surfaces so that the tip of said leaf spring will contact a shoulder on said second one of said surfaces, when said leaf spring has snapped into said indent,
   whereby the removal of said bracket plate from said mounting plate requires the lifting of said leaf spring away from said shoulder against which said leaf spring has contact to free said leaf spring from said indent.

4. A bracket capable of being removably locked to a wall comprising:
   an anchor plate adapted to be attached to a wall and having an indent along one edge,
   a bracket plate having a back surface,
   a leaf spring attached to the back surface of said bracket plate, said leaf spring being adapted to fit said indent, and
   means for mounting said bracket plate on said anchor plate in a position where said leaf spring will snap into said indent,
   whereby the removal of said bracket plate from said mounting plate requires the lifting of said leaf spring out of said indent.

5. A bracket capable of being removably locked to a wall comprising:
   an anchor plate adapted to be attached to a wall and having an indent along one edge,
   a bracket plate having a back surface,
   a leaf spring attached to the back surface of said bracket plate, said leaf spring curving backwards, and
   means for mounting said bracket plate on said anchor plate in a position where said leaf spring will snap into said indent,
   said leaf spring being curved sufficiently far back so that the tip of said leaf spring will contact the wall surface when said leaf spring has snapped into said indent,
   whereby the removal of said bracket plate from said mounting plate requires the lifting of said leaf spring away from said wall surface sufficiently to free said leaf spring from said indent.

6. A bracket capable of being removably locked to a wall comprising:
   an anchor plate adapted to be attached to a wall, and having an indent along one edge,
   a bracket plate having rearwardly extending edges whereby a shallow chamber is formed between the back surface of said bracket plate and the wall surface on which said bracket plate is mounted,
   means within said chamber for mounting said bracket plate on said anchor plate, and
   a leaf spring adapted to fit said indent and attached to the back surface of said bracket plate, said leaf spring being curved backward, said leaf spring being positioned on said anchor plate at a position where said leaf spring will snap into said indent when said bracket plate is mounted on said anchor plate, said leaf spring being curved sufficiently far back so that the tip of said leaf spring will contact the wall surface when said leaf spring had snapped into said indent,
   whereby the removal of said bracket plate from said mounting plate requires the lifting of said leaf spring away from said wall sufficiently to free said leaf spring from said indent.

7. A bracket capable of being removably locked to a wall comprising:
   an anchor plate adapted to be attached to a wall, and having an indent along one edge,
   a bracket plate having rearwardly extending edges whereby a shallow chamber is formed between the back surface of said bracket plate and the wall surface on which said bracket plate is mounted,
   a stem extending from the rear surface of said bracket plate into said chamber,
   a head member on said stem, said head member having at least one dimension in the plane parallel to the main surface of said bracket plate that is larger than a corresponding parallel dimension of said stem,
   said anchor plate having a first opening adapted to receive said head member and a second opening adapted to receive said stem, said second opening being in communication with said first opening, said second opening having a thickness substantially equal to the height of said stem, there being an anterior opening behind said second opening to accommodate said head portion whereby said head portion may be locked behind said second opening against withdrawal in a direction parallel to the major axis of said stem, and a leaf spring attached to the back surface of said bracket plate, said leaf spring being curved backward, said leaf spring being positioned on said anchor plate at a position where said leaf spring will snap into said indent when said stem portion is brought into position within said second opening, said leaf spring being curved sufficiently far back so that the tip of said leaf spring will contact the wall surface when said leaf spring had snapped into said indent, whereby the removal of said bracket plate from said mounting plate requires the lifting of said leaf spring away from said wall sufficiently to free said leaf spring from said indent.

8. The bracket of claim 7 further characterized by:

a third opening in said anchor plate in communication with said second opening, a pin extending from said rear surface of said bracket plate and adapted to be received by said third opening when said bracket plate is mounted on said anchor plate, whereby said pin will prevent rotation of said bracket plate about said anchor plate.

References Cited by the Examiner

UNITED STATES PATENTS 2,176,644   10/39   Sladek _____ 248—225

CLAUDE A. LE ROY, *Primary Examiner.*